Dec. 12, 1933.  F. A. L. BLOOM  1,938,889
APPARATUS FOR CONDITIONING FOODS
Filed Sept. 10, 1928   3 Sheets-Sheet 1
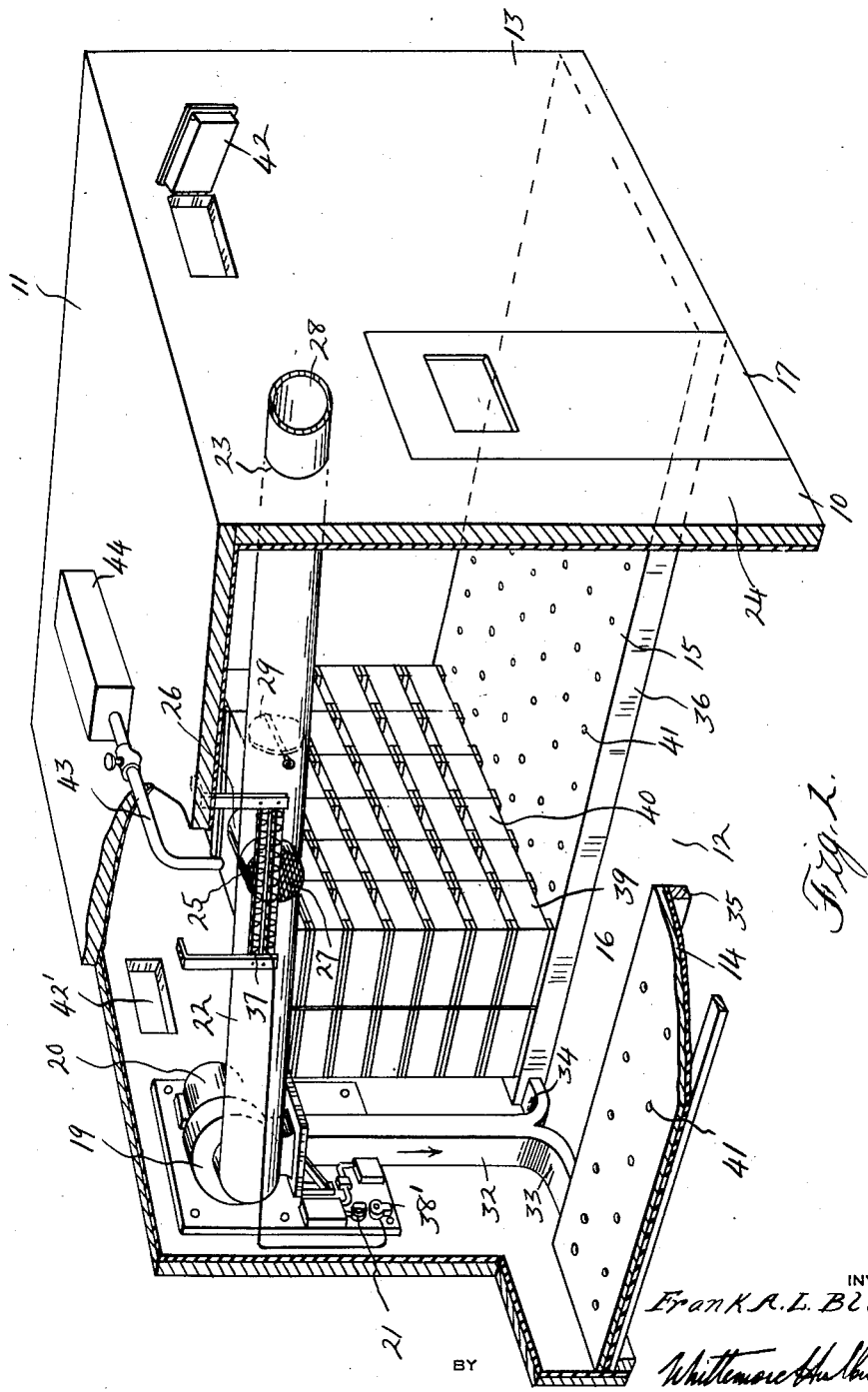
INVENTOR,
Frank A. L. Bloom
BY
ATTORNEYS Dec. 12, 1933.  F. A. L. BLOOM  1,938,889
APPARATUS FOR CONDITIONING FOODS
Filed Sept. 10, 1928   3 Sheets-Sheet 2
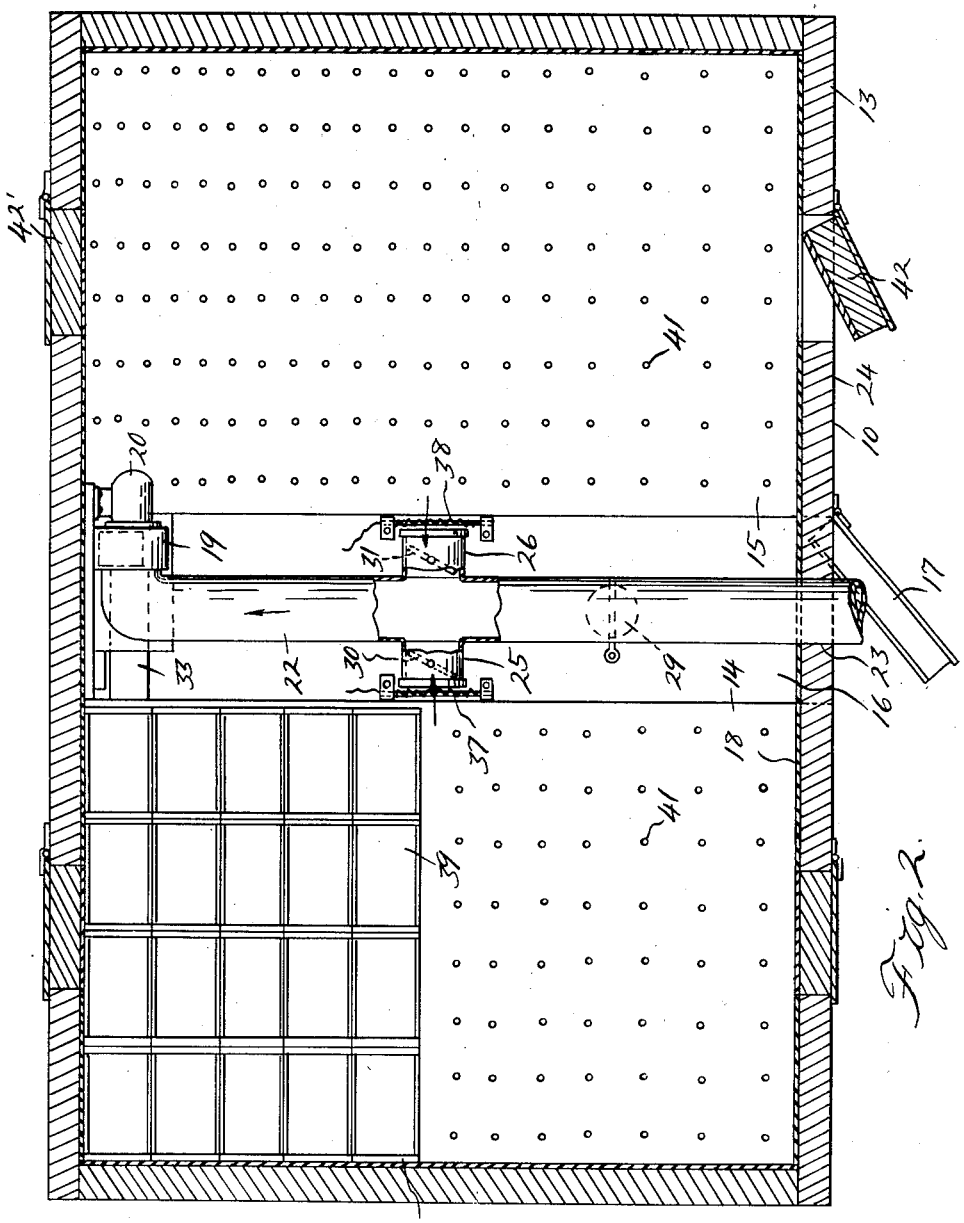
INVENTOR
Frank A. L. Bloom
BY
ATTORNEYS

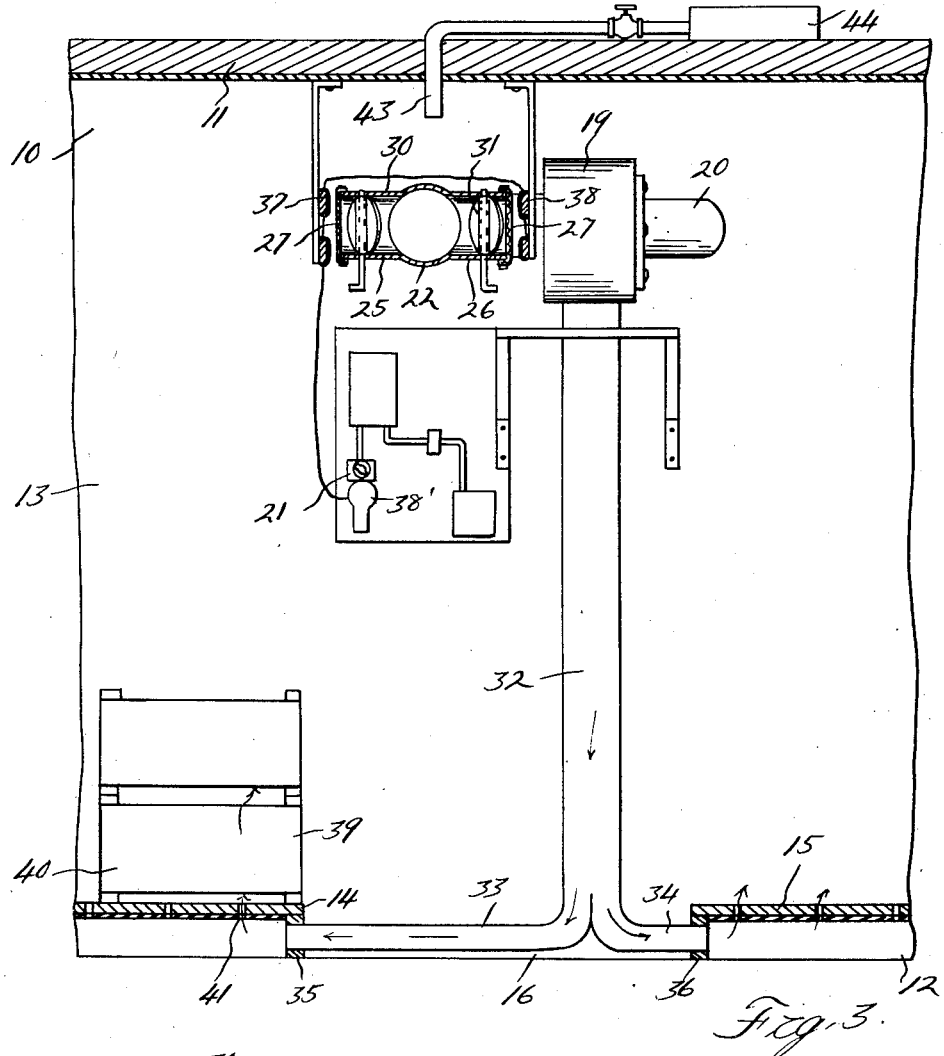
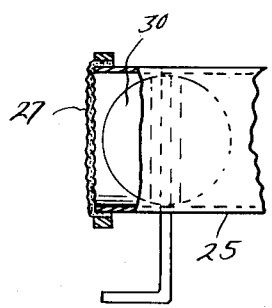

Patented Dec. 12, 1933

1,938,889

UNITED STATES PATENT OFFICE 1,938,889

APPARATUS FOR CONDITIONING FOODS

Frank A. L. Bloom, Detroit, Mich.

Application September 10, 1928
Serial No. 305,008

22 Claims. (Cl. 99—2)

This invention relates to an apparatus for conditioning foods and refers more particularly to an apparatus wherein fruits, vegetables and other natural foods may be thoroughly ripened for table or other uses.

One of the essential objects of the present invention is to provide an efficient apparatus of this type that is simple and compact in construction, and that may be automatically and economically operated.

Many of the advantages and much of the commercial value and acceptibility of the present invention is attributed to the novel construction and arrangement of the ripening chamber. Such advantages are also attributable to the simplicity of the apparatus and the expeditious manner in which the same operates to condition the foods contained therein. Thus the invention relies for some of its advantages upon the specific details of construction illustrated and about to be described.

In the drawings,

Figure 1 is a fragmentary perspective view of a ripening chamber constructed in accordance with this invention;

Figure 2 is a plan view partly in section of the construction illustrated in Figure 1;

Figure 3 is a vertical fragmentary sectional view of the ripening chamber showing the blower arrangement;

Figure 4 is a detail sectional view showing the filtering apparatus.

Referring now to the drawings, in which one embodiment of the apparatus utilized for conditioning the foods is illustrated, the reference character 10 designates a chamber of any suitable size having top, bottom and side walls 11, 12 and 13 respectively. Positioned upon the bottom 12 of the chamber is a pair of spaced floor sections or platforms 14 and 15 extending above the bottom 12 aforesaid and forming therewith a longitudinally extending passage 16 leading at one end to a suitable door 17. If desired, a suitable insulating material may be applied to the top, bottom and side walls 11, 12 and 13 respectively of the chamber 10.

Secured upon one wall of the chamber, preferably the rear wall 18 substantially above the passage 16 so as not to obstruct the space above the floor sections 14 and 15, is a blower 19 of any suitable design driven by a prime mover preferably in the form of an electric motor 20, controlled by a suitable switch 21. Connected to the intake side of the blower is a conduit or pipe 22 extending across the chamber 10 parallel to the passage 16 and projecting through an aperture 23 in the front wall 24 of the chamber so as to receive air from the exterior of the chamber. Projecting laterally from opposite sides of the pipe 22, and communicating with the latter intermediate the ends of the same is a pair of branch pipes 25 and 26. Detachably secured in any suitable manner to the outer ends of the branch pipes are filtering pads 27 composed of any suitable filtering material, and adapted to clean the air prior to its entrance into the pipe 22. In order to adequately control the amount of air entering the pipe 22 through the open end 28 of the same, a suitable damper 29 is secured within the pipe 22 between the opening 28 and lateral branches 25 and 26. The amount of air entering the pipe 22 through the branch pipes 25 and 26 is controlled by the dampers 30 and 31 suitably secured in the pipes 25 and 26 respectively to the rear of the filtering pads 27.

Projecting downwardly from the discharge side of the blower intermediate the two floor sections 14 and 15 is a pipe 32 terminating at the lower end in lateral extensions 33 and 34. The extension 33 preferably extends through the side wall 35 of floor section 14 and operates to discharge air under this floor section, while the extension 34 extends through the wall 36 of the floor section 15 to discharge air under the same.

In order to obtain the proper temperature within the chamber, the air drawn in through the branch pipes 25 and 26 is preheated. This may be accomplished in various ways, herein shown for the purpose of illustration, as by means of the electrically operated heating elements 37 and 38 positioned in close proximity to the pipes 25 and 26. The elements 37 and 38 are preferably thermostatically controlled by means of a thermostat 38' which may be of any suitable construction.

Referring now to the operation of the apparatus heretofore described, and also to the method of procedure in conditioning the foods, it should be understood that the green or unripened foods are first separated from the ripe foods elsewhere and placed in specially designed crates 39. Such crates with the green food therein are then transferred to the chamber 10 where they are placed in tiers upon the floor sections 14 and 15 substantially as indicated by the reference numeral 40. After the desired number of crates are placed within the chamber, the switch 21 is manipulated to start the motor 20 and accordingly the blower 19. The thermostat for automatically controlling the heating units is set for the desired temperatures depending upon the desired rate of conditioning the food to be ripened. The damper 29 is then closed and the dampers 30 and 31 opened, so that the blower will draw air from the interior of the chamber through the branch pipes 25 and 26. The air drawn in through these pipes will be forced through the pipe 32 and discharged beneath the floor sections 14 and 15 and crates supported by these sections. The heated air then passes upwardly through a plurality of suitable openings 41 formed in the floor sections and filters through the contents of the crates. Upon continued circulation of the air contained within the chamber, considerable oxygen is absorbed by the contents of the crates rendering the air stale and unfit for use. When this condition arises, the small doors 42 in the sides of the chamber adjacent the top thereof are opened permitting the stale air to escape and at the same time, the dampers 30 and 31 are closed and the damper 29 is opened permitting the blower to draw in fresh air from the exterior of the chamber. This latter operation causes the stale air in the chamber to be expelled through suitable ports 42' in the walls of the chamber and is resorted to whenever it is found necessary to replenish the fresh air within the chamber. In ripening certain classes of food, I have found that the ripening process may be greatly facilitated by injecting ethylene or some similar gas into the chamber 10. In order to accomplish this, a suitable tank containing ethylene or any suitable gas is placed in close proximity to the chamber and connected thereto by means of the valve controlled pipe 43 extending from the tank 44 and projecting into the chamber 10. Thus when it is desired to increase the ethylene within the room, the valve in the pipe 43 is merely opened permitting the gas contained within the tank to flow into the chamber and intermingle with the air drawn in by the blower 19.

From the foregoing it will be apparent that I have provided a ripening chamber having means for maintaining the temperature within the chamber substantially uniform throughout all portions thereof so that the contents of all the containers will be uniformly ripened as distinguished from the method of ripening heretofore used wherein it was necessary to frequently shift the containers to different places in the chamber due to temperature changes in the chamber. This condition is avoided in the present instance by expelling the warm air beneath the containers and permitting the same to flow upwardly therethrough.

Thus from the foregoing, it will be readily apparent that I have provided a relatively inexpensive process for ripening natural foods which renders possible eliminating the waste usually present in the commercial distribution of such foods. It will further be apparent that I have devised an apparatus capable of performing the foregoing process efficiently and expeditiously.

What I claim as my invention is:

1. A system for conditioning produce, including a chamber having a floor, laterally spaced platforms upon the floor of the chamber and forming therewith a longitudinally extending passage, each platform having imperforate side walls at the edges of the passage and having perforated top walls, a blower within the chamber, means for conducting air from the atmosphere to the blower including a pipe extending through a wall of the chamber for receiving air from the exterior of the chamber, a damper in the pipe for controlling the passage of air to the blower, a pair of branch pipes projecting laterally from the pipe aforesaid between the damper and blower for conducting air from within the chamber to the first-mentioned pipe, means in the branch pipes for regulating the flow of air from within the chamber to the first-mentioned pipe, means for conducting air from the blower to spaces between the floor of the chamber and the apertured top walls of the platforms, including branch pipes extending through the imperforate walls of the platforms, and a pipe extending from the blower to said last-mentioned branch pipes.

2. A system for conditioning produce, including a chamber having a floor, laterally spaced apertured platforms upon the floor of the chamber and forming therewith a longitudinally extending passage, a blower within the chamber, means for conducting air from the atmosphere to the blower including a pipe extending through a wall of the chamber for receiving air from the exterior of the chamber, a damper in the pipe for controlling the passage of air to the blower, a branch pipe projecting laterally from the pipe aforesaid between the damper and blower for conducting air from within the chamber to the first-mentioned pipe, means for regulating the flow of air through the branch pipe, means for conducting air from the blower to spaces between the platforms and the floor of the chamber, including branch pipes extending transversely of the passage aforesaid into the spaces between the platforms and the floor of the chamber, and a pipe extending from the blower to said last-mentioned branch pipes, and means for directing air from the apertured platforms around the produce to be ripened.

3. A system for conditioning produce, including a chamber, laterally spaced platforms upon the bottom of the chamber and forming therewith a longitudinally extending passage, each platform having imperforate side walls at the edges of the passage and having perforated top walls, a blower within the chamber, means for conducting air from the atmosphere to the blower including a pipe extending through a wall of the chamber for receiving air from the exterior of the chamber, a damper in the pipe for controlling the passage of air to the blower, a branch pipe projecting laterally from the pipe aforesaid between the damper and blower for conducting air from within the chamber to the first-mentioned pipe, means for regulating the passage of air through the branch pipe to the first-mentioned pipe, means for conducting air from the blower to spaces between the floor of the chamber and the apertured top walls of the platforms including branch pipes extending transversely of the passage and through the imperforate walls of the platform, and a pipe extending from the blower to said last-mentioned branch pipe, means for injecting ethylene gas into the chamber to be intermingled with air drawn in by the blower, and means for directing upwardly around the produce to be ripened the air received from the apertures in the platforms.

4. A system for conditioning produce, including a chamber, a platform upon the bottom of the chamber, having an imperforate side wall and a perforated top wall, a blower within the chamber, means for conducting air from the atmosphere to the blower including a pipe extending through a wall of the chamber for receiving air from the exterior of the chamber, a damper in the pipe for controlling the passage of air to the blower, a branch pipe projecting laterally from the pipe aforesaid between the damper and blower for conducting air from within the chamber to the first-mentioned pipe, means at the outer end of said branch pipe for heating air received thereby, means between said heating means and first-mentioned pipe for regulating the passage of warm air to said first-mentioned pipe, and means for conducting warm air from the blower to the space between the floor of the chamber and the apertured top wall of the platform, including a branch pipe extending through the imperforate wall of the platform and a pipe extending from the blower to said last-mentioned branch pipe.

5. In an apparatus for preripening produce, the combination of a closed container provided with an apertured floor for supporting the produce under treatment, a plurality of ducts discharging beneath said floor, a duct leading from the top of the container and communicating with the first mentioned ducts to furnish a closed circulatory system, a fan in said circulatory system discharging into said first mentioned ducts, heating means in said system, a gas pipe leading to said system and discharging thereinto on the intake side of said fan, and a source of supply of gas to which said pipe is connected for supplying gas for admixture with the air circulated through said system.

6. A system for conditioning produce, including a chamber having a floor, laterally spaced apertured platforms upon the floor of the chamber and forming therewith a longitudinally extending passage, a blower within the chamber, means for conducting air from the atmosphere to the blower including a pipe extending through a wall of the chamber for receiving air from the exterior of the chamber, a damper in the pipe for controlling the passage of air to the blower, a branch pipe projecting laterally from the pipe aforesaid between the damper and blower for conducting air from within the chamber to the first-mentioned pipe, means for regulating the flow of air through the branch pipe, and means for conducting air from the blower to spaces between the platforms and the floor of the chamber, including branch pipes extending transversely of the passage aforesaid into the spaces between the platforms and the floor of the chamber, and a pipe extending from the blower to said last-mentioned branch pipes.

7. A system for conditioning produce, including a chamber, laterally spaced platforms upon the bottom of the chamber and forming therewith a longitudinally extending passage, each platform having imperforate side walls at the edges of the passage and having perforated top walls, a blower within the chamber, means for conducting air from the atmosphere to the blower including a pipe extending through a wall of the chamber for receiving air from the exterior of the chamber, a damper in the pipe for controlling the passage of air to the blower, a branch pipe projecting laterally from the pipe aforesaid between the damper and blower for conducting air from within the chamber to the first-mentioned pipe, means for regulating the passage of air through the branch pipe to the first-mentioned pipe, means for conducting air from the blower to spaces between the floor of the chamber and the apertured top walls of the platforms including branch pipes extending transversely of the passage and through the imperforate walls of the platform, and a pipe extending from the blower to said last-mentioned branch pipe, and means for injecting ethylene gas into the chamber to be intermingled with air drawn in by the blower.

8. A system for conditioning produce, including a closed chamber having a floor, an apertured platform spaced above the floor, means at the edges of the platform for closing the space between the platform and floor, a blower within the chamber, means within the chamber for conducting air to the blower, means for conducting the air from the blower to the closed space between the platform and floor, means associated with the second mentioned means for heating the air, means also associated with the second mentioned means for filtering the heated air, means including a door for the chamber operable to permit fresh air from the atmosphere to be received by the second mentioned means, means associated with the second mentioned means for introducing ethylene gas into the system, and means operable to permit the escape of stale air from the chamber.

9. A system for conditioning produce, including a closed chamber having a floor and having openings for the reception and discharge of air, means associated with said openings for controlling the flow of air therethrough, an apertured platform above the floor, means at the edges of the platform for closing the space between the platform and floor, means within the chamber for circulating air in the closed space between the platform and floor including a blower, means for conducting air to the blower, means associated with the last mentioned means for heating the air before it is received by the blower, means adjacent the last mentioned means for introducing ethylene gas into the air, and means for conducting the heated air containing the ethylene gas from the blower to the space between the platform and floor.

10. A system for conditioning produce, including a closed chamber having a floor and having openings for the reception and discharge of air, means associated with said openings for controlling the flow of air therethrough, an apertured platform above the floor, means at the edges of the platform for closing the space between the platform and floor, means within the chamber for circulating air in the closed space between the platform and floor including a blower, means for conducting air to the blower, means associated with the last mentioned means for filtering the air before it is received by the blower, means adjacent the filtering means for introducing ethylene gas into the air, and means for conducting the filtered air containing ethylene gas from the blower to the space between the platform and floor.

11. A system for conditioning produce, including a chamber having a floor, a platform upon the floor and having a perforated top wall, means at the edges of the platform for closing the space between said platform and floor, a blower within the chamber, means for conducting air from the atmosphere to the blower including a pipe extending through a wall of the chamber for receiving air from the exterior of the chamber, a damper in the pipe for controlling the passage of air to the blower, a branch pipe projecting laterally from the pipe aforesaid between the damper and blower for conducting air from within the chamber to the first-mentioned pipe, means associated with the branch pipe for heating the air, means also associated with said branch pipe for filtering the heated air, and means for conducting the heated filtered air from the blower to the space between the floor of the chamber and the apertured top wall of the platform.

12. A system for conditioning produce, including a chamber having a floor, an apertured platform spaced above the floor, means at the edges of the platform for closing the space between the said platform and floor, a blower within the chamber, a pipe extending through a wall of the chamber and connected to the blower for conducting air from the atmosphere to the blower, means for conducting air from the blower to the space between the floor and the platform, means for conducting ethylene gas into the chamber, means for heating the air discharged from the apertures in the top wall of the platform, and means for conducting the heated air and gas to the first-mentioned pipe.

13. A system for conditioning produce, including a chamber having a floor, an apertured platform spaced above the floor, means at the edges of the platform for closing the space between said platform and floor, a blower within the chamber, a pipe extending through a wall of the chamber and connected to the blower for conducting air from the atmosphere to the blower, means for conducting air from the blower to the space between the floor and the apertured platform, a pipe for receiving the air discharged from the apertures in the top wall of the platform and conducting it back to the first-mentioned pipe, means adjacent the last-mentioned pipe for heating the air, means associated with the last-mentioned pipe for filtering the heated air, a damper in the last-mentioned pipe controlling the supply of filtered, heated air to the first-mentioned pipe, and means in the first-mentioned pipe operable to cut off the supply of air from the atmosphere to the blower when the damper aforesaid is open.

14. A system for conditioning produce, including a chamber having a floor, an apertured platform spaced above the floor, a blower within the chamber, a pipe extending through a wall of the chamber and connected to the blower for conducting air from the atmosphere to the blower, means for conducting air from the blower to the space between the floor and the apertured platform, a pipe for receiving the air discharged from the apertures in the platform and conducting it back to the first-mentioned pipe, means adjacent the last-mentioned pipe for heating the air, means associated with the last-mentioned pipe for filtering the heated air, a damper in the last-mentioned pipe controlling the supply of filtered, heated air to the first-mentioned pipe, and means operable to permit the escape of stale air from the chamber when the damper aforesaid is closed.

15. A system for conditioning produce, including a chamber having a floor, an apertured platform above the floor, a blower within the chamber, means for conducting air from the atmosphere to the blower including a pipe extending through a wall of the chamber, means for conducting air from the blower to the space between the apertured platform and the floor, means for receiving air passing upwardly from the openings in the platform and conducting it to the pipe aforesaid including a branch pipe connected to the pipe aforesaid intermediate its ends, means adjacent the branch pipe for heating the air, means associated with the branch pipe for filtering the heated air, and a damper in the first-mentioned pipe between the last-mentioned pipe and the outer open end thereof operable to cut off communication with the atmosphere and permit of continued circulation of heated, filtered air from the branch pipe and through the inner portion of the first-mentioned pipe, blower, second-mentioned means, and apertures in the top wall of the platform.

16. A system for conditioning produce, including a chamber having a floor, a platform upon the floor of the chamber and having a perforated top wall, a blower within the chamber, means for conducting air from the atmosphere to the blower including a pipe extending through a wall of the chamber, a damper in said pipe for controlling the passage of air to the blower, means for conducting air from the blower to the space between the floor of the chamber and the apertured platform, a portion of the pipe aforesaid between the damper and blower being adjacent the top wall of the chamber, means for commingling ethylene gas with the air discharged from the said apertures, means for heating the mixture of air and gas, means for filtering the mixture, and means for conducting the heated, filtered mixture to said pipe including a branch pipe projecting laterally from the portion aforesaid of said pipe.

17. In an apparatus for preripening produce, a closed container provided with an apertured floor for supporting the produce under treatment, a duct discharging beneath said floor, a duct leading from the top of the container and communicating with the first-mentioned duct, a fan discharging into said first-mentioned duct, heating means in said container, a gas pipe leading to said container and discharging thereinto on the intake side of said fan, and a source of supply of gas to which said pipe is connected for supplying gas for admixture with the air circulated in the said container.

18. A system for conditioning produce, including a closed chamber having a floor, a platform on said floor and having an apertured top spaced from the floor, a blower within the chamber, means for conducting air to the blower, means within the chamber for heating air, means for introducing ethylene gas into the air within the chamber, means for conducting the heated air containing ethylene gas to the air conducting means aforesaid, and means for conducting such air and gas from the blower to the space between the floor and the apertured top of the platform.

19. A system for conditioning produce, including a closed chamber having a floor, a platform on said floor and having an apertured top spaced from the floor, a blower within the chamber, means for conducting air to the blower, means within the chamber for filtering the air before it is received by the blower, means adjacent the filtering means for introducing ethylene gas into the air, and means for conducting the filtered air containing the ethylene gas from the blower to the space between the platform and floor.

20. A system for conditioning produce, including a chamber having a floor, a platform on the floor and having an apertured top spaced from the floor, a blower within the chamber discharging into the space between the floor and the apertured top of the platform, means for conducting air from the exterior of the chamber to said blower, means for controlling the passage of air through said conducting means, means within the chamber for heating air, means for commingling ethylene gas with the heated air, means for conducting the heated air and gas to the conducting means aforesaid, and means for controlling the passage of heated air and gas through said last-mentioned conducting means.

21. A system for conditioning produce including a chamber having a floor, a platform on the floor and having an apertured top spaced from the floor, a blower within the chamber having an outlet pipe discharging into the space between the floor and the apertured top of the platform and having an inlet pipe associated with the wall of the chamber for receiving air from the exterior of the chamber, means for regulating the flow of air from the exterior of the chamber to said blower, means within the chamber for heating the air, means for commingling ethylene gas with said heated air, means between said blower and regulating means for conducting the commingled gas and air from within the chamber to said inlet pipe, and means for controlling the passage of the commingled gas and air through said conducting means.

22. A system for conditioning produce including a chamber having a floor, a platform on the floor and having an apertured top spaced from the floor, a blower within the chamber having an outlet pipe discharging into the space between the floor and the apertured top of the platform and having an inlet pipe associated with a wall of the chamber for receiving air from the exterior of the chamber, means for regulating the flow of air from the exterior of the chamber to said blower, means between said blower and regulating means for conducting air from within the chamber to said inlet pipe, means for controlling the passage of air through said conducting means, means for commingling ethylene gas with air within said chamber, means for heating such commingled gas and air, and means associated with the conducting means for filtering the heated commingled gas and air before such mixture is received.

FRANK A. L. BLOOM.